(12) United States Patent
Zernickel et al.

(10) Patent No.: US 7,017,437 B1
(45) Date of Patent: Mar. 28, 2006

(54) BALL SCREW

(75) Inventors: Alexander Zernickel, Herzogenaurach (DE); Rolf Fleischhauer, Furth (DE)

(73) Assignee: INA-Schaeffler KG, (DE)

( * ) Notice: Subject to any disclaimer, the term of this patent is extended or adjusted under 35 U.S.C. 154(b) by 0 days.

(21) Appl. No.: 10/149,657

(22) PCT Filed: Nov. 15, 2000

(86) PCT No.: PCT/EP00/11266

§ 371 (c)(1),
(2), (4) Date: Jun. 10, 2002

(87) PCT Pub. No.: WO01/44689

PCT Pub. Date: Jun. 21, 2001

(30) Foreign Application Priority Data

Dec. 17, 1999 (DE) .............................. 199 60 938
Mar. 14, 2000 (DE) .............................. 100 12 231

(51) Int. Cl.
*F16H 27/02* (2006.01)

(52) U.S. Cl. ................ 74/89.42; 74/424.75; 74/424.86

(58) Field of Classification Search ............... 74/89.42, 74/424.75, 424.81–424.84, 424.86, 424.87
See application file for complete search history.

(56) References Cited

U.S. PATENT DOCUMENTS

| 2,473,743 | A | * | 6/1949 | Barnes ..................... 74/424.82 |
| 2,924,113 | A | | 2/1960 | Orner |
| 3,009,367 | A | | 11/1961 | Striggow |
| 3,393,575 | A | * | 7/1968 | Irwin ......................... 74/89.42 |
| 3,815,435 | A | * | 6/1974 | Eschenbacher et al. .. 74/424.87 |
| 4,074,587 | A | * | 2/1978 | Brusasco ................. 74/424.82 |
| 4,364,282 | A | * | 12/1982 | Nilsson ................... 74/424.82 |
| 4,509,382 | A | * | 4/1985 | Colautti et al. ............ 74/89.42 |
| 4,612,817 | A | * | 9/1986 | Neff ........................ 74/424.75 |
| 4,841,796 | A | * | 6/1989 | Teramachi ............... 74/424.86 |

FOREIGN PATENT DOCUMENTS

| DE | 3323345 | 1/1985 |
| DE | 4131486 | 3/1993 |
| DE | 4340624 | 7/1994 |
| GB | 8911025 | 3/1962 |

* cited by examiner

*Primary Examiner*—David Fenstermacher
(74) *Attorney, Agent, or Firm*—Charles A. Muserlian

(57) ABSTRACT

In a ball screw drive comprising a spindle (1), a nut (3) surrounding the spindle (1), and balls (4) arranged between the spindle (1) and the nut (3), which balls (4) are in rolling contact with a screw track (2) formed on the spindle (1) and on corresponding screw tracks (7, 12) formed on rings arranged within the nut (3) comprises a deflecting region for returning the balls (4) from a run-out end of a common turn of the screw tracks (2, 7, 12) to a run-in end of this turn, the screw tracks (7, 12) of the rings arranged in the nut (3, 15) are made on front faces of these rings with the screw tracks (7, 12) of two adjacent rings defining together with the screw track (2) of the spindle (1, 18), an endless circulation channel for the balls (4).

9 Claims, 3 Drawing Sheets

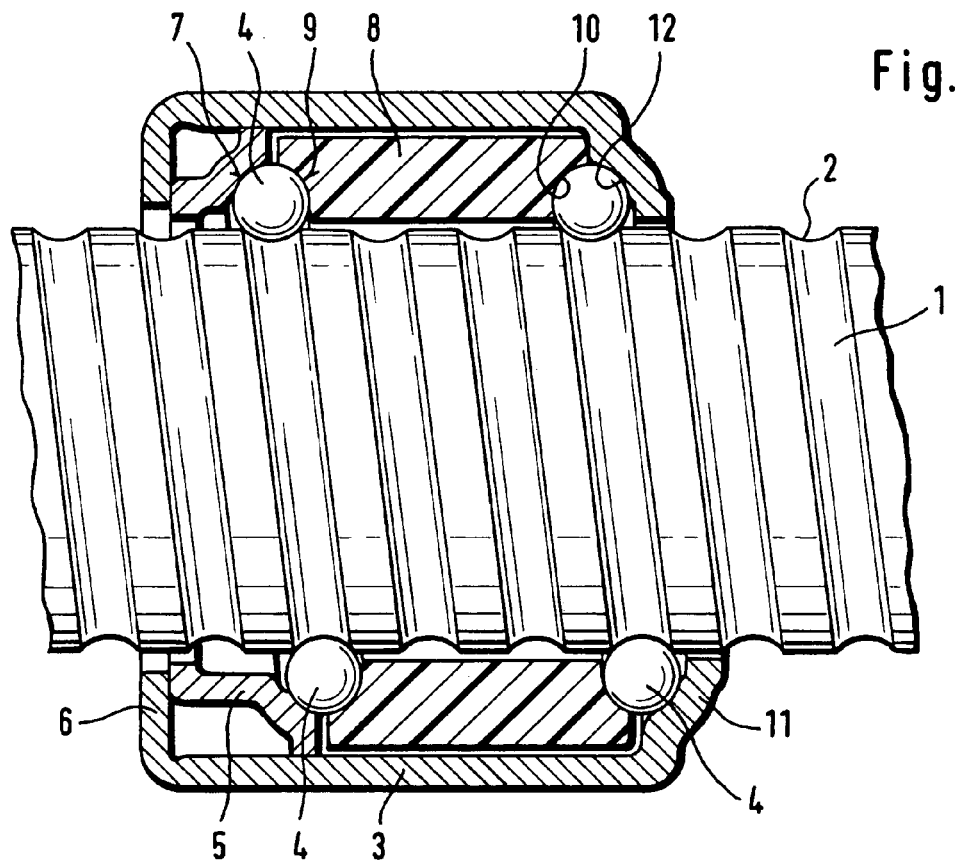
Fig. 1
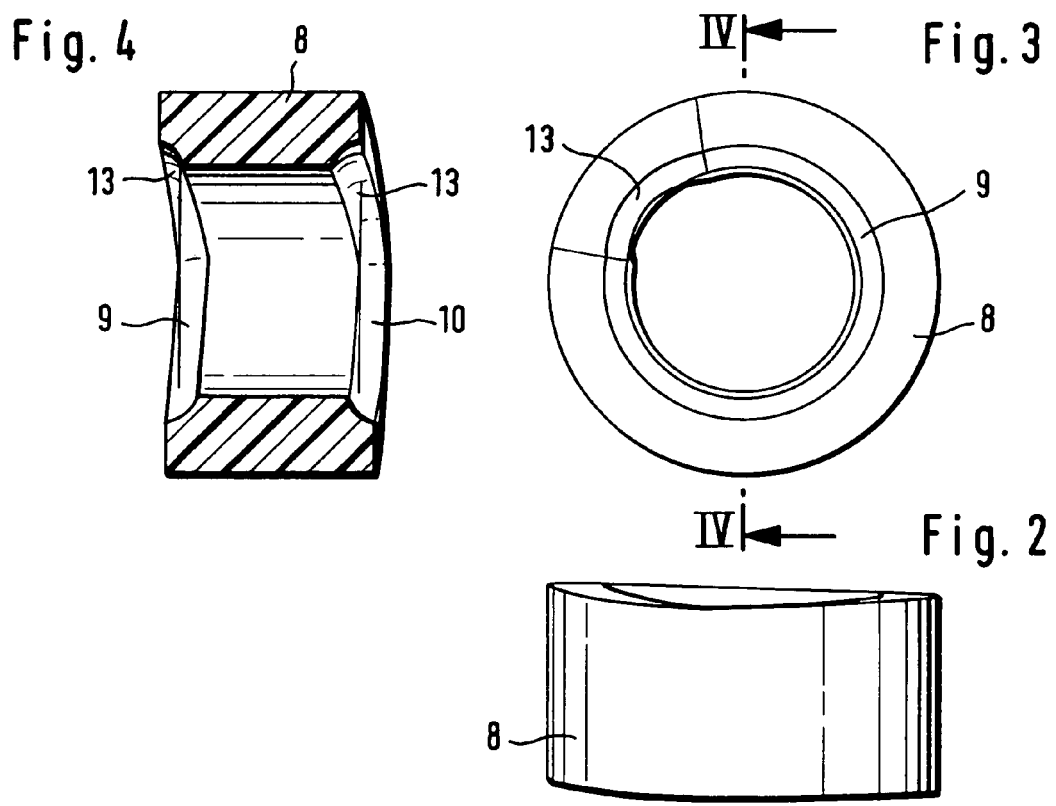
Fig. 4
Fig. 3
Fig. 2

BALL SCREW

This application is a 371 of PCT/EP00/11266 filed Nov. 15, 2000.

FIELD OF THE INVENTION

The invention concerns a ball screw drive comprising a spindle, a nut surrounding the spindle, and balls arranged between the spindle and the nut, which balls are in rolling contact with a screw track formed on the spindle and on corresponding screw tracks formed on rings arranged within the nut, the screw track of one of the rings arranged within the nut forming a deflecting region for returning the balls from a run-out end of a common turn of the screw tracks to a run-in end of this turn, the screw tracks of the rings arranged in the nut being made on front faces of these rings, so that the screw tracks of two adjacent rings define, together with the screw track of the spindle, an endless circulation channel for the balls.

BACKGROUND OF THE INVENTION

Ball screw drives serve to transform a rotary motion into a translational motion and are used, for example, in the field of automotive vehicles for the adjustment of steering columns and throttle valves, in mechanical transmissions or in electric door-locking mechanisms. In a ball screw drive known from the document DE 33 23 345 A1, two profiled rings are arranged next to each other within a nut body. Each of these rings is made up of two parts, and the two profiled ring parts of each ring abut with flat ends on each other. A gap is situated between two return channel forming sections of the two parts of each profiled ring. As a result, this structure has complicated contours. The two profiled rings are fixed in the nut body by being integrally cast or injected therein.

In a ball screw drive known from the document U.S. Pat. No. 2,924,113 A, two multi-piece rings are arranged in a nut housing. Each ring comprises an outer washer, an inner washer, a radial flange and a tubular wall. All these parts together with the nut housing form a closed chamber that is filled with rubber.

The document U.S. Pat. No. 3,009,367 shows a ball screw drive that is made up of a very large number of individual parts that have to be assembled in a complicated procedure. This ball screw drive is probably very cost-intensive due to the fact that it involves an expensive combination of separate machined parts and shaped parts.

SUMMARY OF THE INVENTION

The object of the invention is to provide a ball screw drive that possesses a high degree of efficiency while being simple to manufacture and easy to assemble and disassemble. At the same time, a displacing device of this type should enable a gentle deflection of the balls with only a slight amount of friction.

The invention achieves the above objects by the fact that one of the rings arranged in the nut is configured as a deflecting cage that comprises screw tracks with deflecting regions on both its front faces.

According to a further proposition of the invention, the nut comprises a bushing flange acting as a ring and comprising a screw track, in which case, an insert ring comprising a screw track is arranged within the nut axially next to the ring-shaped bushing flange.

Finally, according to a third proposition of the invention, the nut is a thin-walled bushing made by shaping without machining and comprises a bent-over bushing flange that serves to close the bushing and to effect lash adjustment and pre-stressing of the ball screw drive, the rings inserted into the nut being two insert rings configured as stamped washers.

As a result of this solution according to the invention, only a few individual parts are required for the ball screw drive, and these parts can be made economically by shaping without machining. In an optimal embodiment, therefore, the ball screw drive is made up of the bushing fabricated by shaping without machining with an integrated track portion made by shaping without machining, the insert ring made by shaping without machining comprising the second track portion, the balls, and the spindle likewise made by shaping without machining comprising a further track portion.

In one embodiment of the screw drive, the insert ring is inserted into the bushing which is then flanged by bending to form the nut. To obtain a defined pre-stress on the ball assembly and to eliminate lash in this screw drive that is configured as a rolling bearing, a spring element can be arranged between the bent-over bushing flange and the insert ring. The spring element can be formed by a ring made of a resilient material.

One of the rings inserted into the nut can be configured as a deflecting cage that comprises screw tracks with deflecting regions on both its front faces. The deflecting cage can be arranged in the nut axially next to an insert ring comprising a screw track. It is also possible to arrange the deflecting cage in the nut with its other axial end next to a bushing flange of the nut comprising a screw track.

Such a ball screw drive comprises only two endless circulation channels for balls. The deflecting cage is arranged within the nut in the intermediate space between the insert ring and the bushing flange that is situated further away from the insert ring. Through the deflecting regions of its screw tracks, the deflecting cage effects a gentle deflection of the balls. Lash adjustment of the ball screw drive can be effected through one of the bushing flanges of the nut configured as a bushing. To obtain a lash-free guidance, a spring can also be disposed in the region of this bushing flange. By virtue of the adjustable bushing flange or the spring, as the case may be, the structure is independent of tolerances.

BRIEF DESCRIPTION OF THE DRAWINGS

Examples of embodiment of the invention are represented in the drawings and will be described more closely below. The drawings show:

FIG. 1, a ball screw drive in longitudinal section;

FIG. 2, an outer peripheral view of a deflecting cage of the ball screw drive;

FIG. 3, an end view of the deflecting cage;

FIG. 4, a longitudinal section through the deflecting cage taken along line IV—IV of FIG. 3;

DETAILED DESCRIPTION OF THE DRAWINGS

Figure 5:
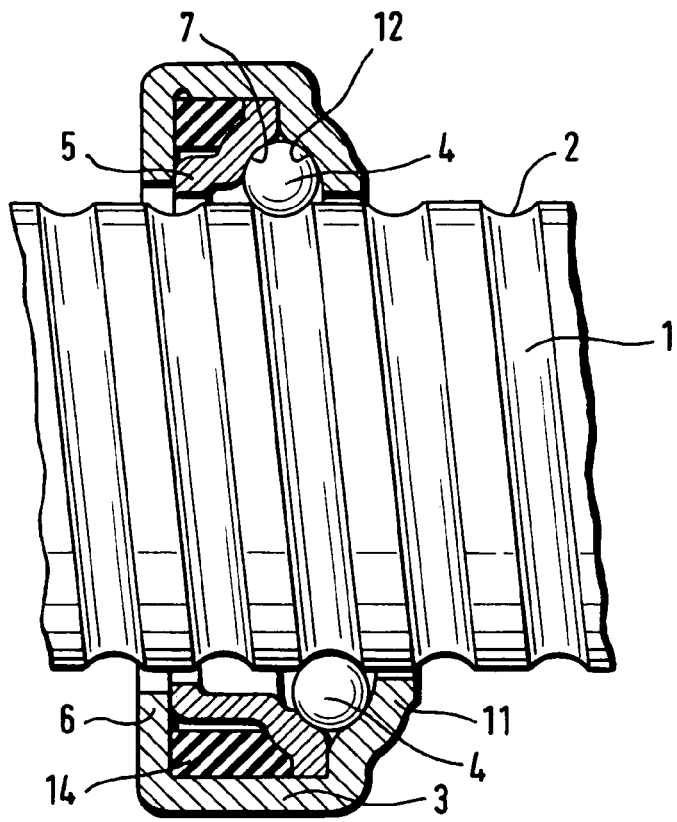
FIG. 5, a modified ball screw drive in longitudinal section.

A ball screw drive according to the invention shown in FIGS. 1 to 4 is arranged on a spindle 1 that comprises a screw track 2 on its outer peripheral surface. A bush-shaped nut 3 surrounds the spindle 1 concentrically and comprises balls 4 that are in rolling contact with the screw track 2 of the spindle 1. The balls 2 are retained for rolling in two endless circuits in the nut 3. This is achieved with the help of an insert ring 5 that is inserted into the nut 3 and is axially supported on a bushing flange 6 of the nut 3. On its end directed away from the bushing flange 6, the insert ring 5 comprises a screw track 7 for the balls 4. Arranged axially next to the insert ring 5 within the nut 3 is a deflecting cage 8 that comprises a screw track 9 on its end directed towards the insert ring 5. The screw track 7 of the insert ring 5 and the screw track 9 of the deflecting cage 8 are arranged so as to define together with the screw track 2 of the spindle 1, an endless channel for the balls 4.

On its end directed away from the insert ring 5, the deflecting cage 8 likewise comprises a screw track 10. The deflecting cage 8 is retained axially in the nut 3 by a bushing flange 11 that likewise comprises a screw track 12, the screw track 10 of the deflecting cage 8 and the screw track 12 of the bushing flange 11 being arranged so as to define together with the screw track 2 of the spindle 1, a further endless circulation channel for the balls 4.

On a part of their peripheries, the screw tracks 9 and 10 of the deflecting cage 8 comprise deflecting regions 13. At the end of one turn of the screw track 2 of the spindle 1, the balls 4 are returned through their respective deflecting region 13 to the beginning of this turn.

A ball screw drive according to the invention shown in FIG. 5 is likewise arranged on a spindle 1 that comprises a screw track 2 on its outer peripheral surface. A bush-shaped nut 3 surrounds the spindle 1 concentrically and comprises balls 4 that are in rolling contact with the screw track 2 of the spindle 1. The balls 2 are retained for rolling in an endless circuit in the nut 3. This is achieved with the help of an insert ring 5 that is inserted into the nut 3 and can be axially supported on a bushing flange 6 of the nut 3. On its end directed away from the bushing flange 6, the insert ring 5 comprises a screw track 7 for the balls 4. Within the nut 3, the insert ring 5 is supported axially on a further bushing flange 11 that likewise comprises a screw track 12. The screw track 7 of the insert ring 5 and the screw track 12 of the bushing flange 11 are arranged so as to define together with the screw track 2 of the spindle 1, an endless circulation channel for the balls 4. On a part of its periphery, the insert ring 5 comprises a deflecting region. At the end of one turn of the screw track 2 of the spindle 1, the balls 4 are returned through the deflecting region to the beginning of this turn. In this embodiment, a gap is arranged between the insert ring 5 and the bushing flanges 6 and 11 of the nut 3.

After the insertion of the insert ring 5, a spring element 14 can be additionally inserted into the nut 3 before this is bent over at its axial end directed away from the bushing flange 11 to form the bushing flange 6. The bushing flange 6 and the spring element 14 serve in common to produce a defined pre-stress in the ball screw drive.

In the examples of embodiment represented in FIGS. 6 to 9, two insert rings 16 and 17 comprising screw tracks 7 are arranged in the nut 15. These rings can be made as stamped washers and define, together with the screw track 2 of an associated spindle 18, an endless circulation channel for the balls 4. For this purpose, each insert ring 16 comprises a load-bearing region 19 and a deflecting region 20.

Figure 6:
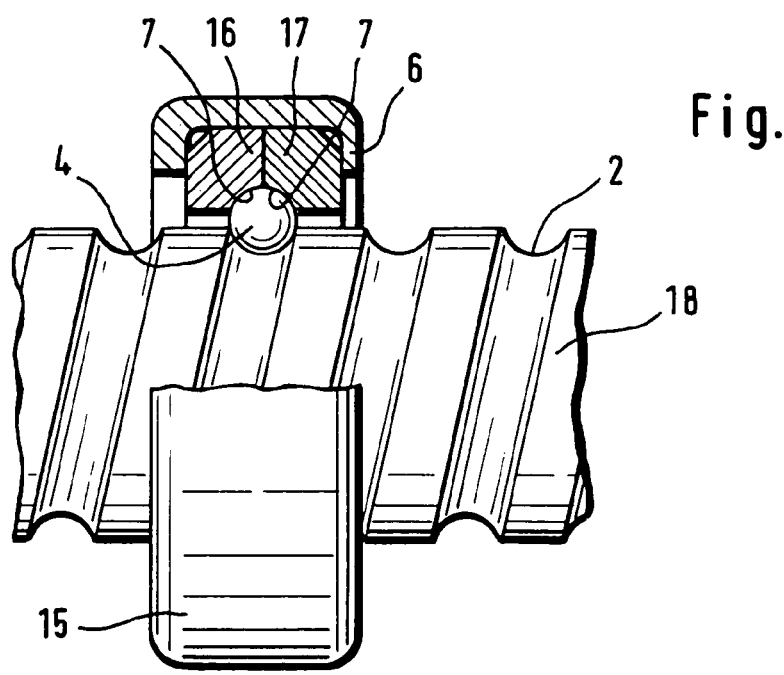
FIG. 6, a further embodiment of the ball screw drive, partly in longitudinal section and partly in a side view.
Figure 7:
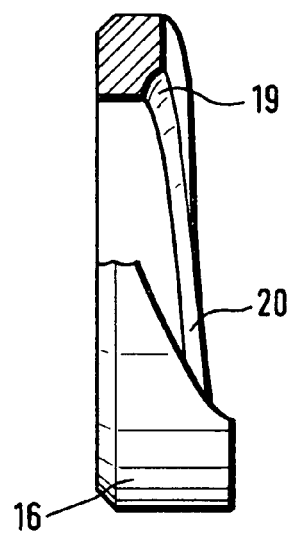
FIG. 7, an insert ring of the ball screw drive of FIG. 6, partly in longitudinal section and partly in a side view.
Figure 8:
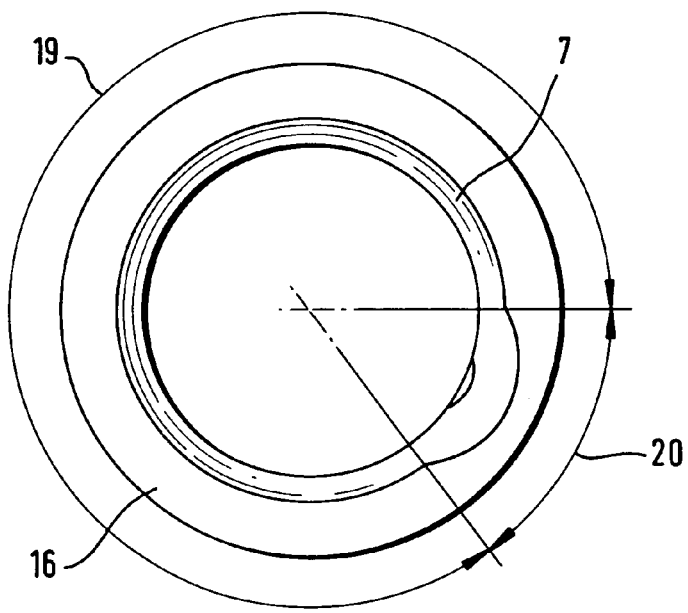
FIG. 8, an end view of the insert ring of FIG. 7.
Figure 9:
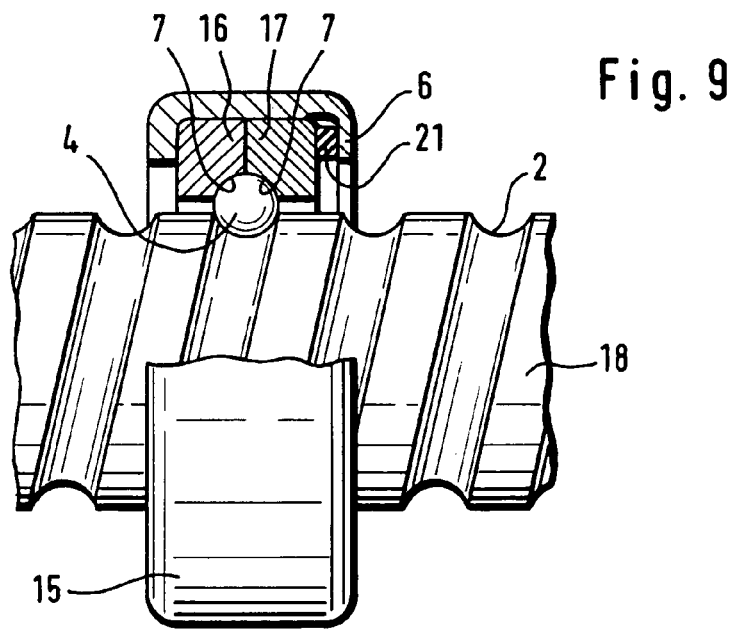
FIG. 9, a ball screw drive similar to that of FIG. 6 but with an additionally inserted spring element.

In the screw drive of FIG. 6, the bushing flange 6 that closes the nut 15 is in direct contact with the insert ring 17, while in FIG. 9, an annular spring element 21 made of an elastic material is arranged between the bushing flange 6 and the insert ring 17 to exert a pre-stress in the screw drive.

The invention claimed is:

1. A ball screw drive comprising a spindle (1, 18), a nut (3, 15) surrounding the spindle (1, 18), and balls (4) arranged between the spindle (1, 18) and the nut (3, 15), which balls (4) are in rolling contact with a screw track (2) formed on the spindle (1, 18) and on corresponding screw tracks (1,9, 10, 12) formed on rings arranged within the nut (3, 15), at least one of these rings forming deflecting region (13, 20) for returning the balls (4) from a run-out end of a common turn of the screw tracks (7, 9, 10, 12) to a run-in end of this turn, the screw tracks (7, 9, 10, 12) of the rings arranged in the nut (3, 15) being made on front faces of these rings, so that the screw tracks (7, 9, 10, 12) of two adjacent rings define, together with the screw track (2) of the spindle (1, 18), an endless circulation channel for the balls (4), characterized in that the nut (3, 15) is a thin-walled bushing made by shaping without machining that comprises a bent-over bushing flange (6) wherein one of these rings is axially supported on the bushing flange (6) of the nut (3).

2. A screw drive according to claim 1, characterized in that the bushing flange (6) effects lash adjustment and pre-stressing of the ball screw drive.

3. A screw drive of claim 1, characterized in that the rings arranged in the nut (15) are two insert rings (16, 17) that are configured as stamped washers.

4. A screw drive of claim 1, wherein a spring element (14, 21) is arranged in the nut (15) between the bent-over flange (6) and the insert ring (5, 17).

5. A screw drive of claim 4, wherein the spring element (14, 21) is configured as a ring and made of a resilient material.

6. A ball screw drive according to claim 1, characterized in that the nut (3) comprises a bushing flange (11) that acts as a ring and comprises a screw track (12), an insert ring (5) comprising a screw track (7) being arranged within the nut (3) axially next to the annular bushing flange (11).

7. A screw drive according to claim 1, characterized in that one of the rings arranged in the nut (3) is configured as a deflecting cage (8) that comprises on both its front faces, screw tracks (9, 10) having deflecting regions (13).

8. A screw drive according to claim 7, characterized in that the deflecting cage (8) is arranged in the nut (3) axially next to an inert ring (5) comprising a screw track (7).

9. A screw drive according to claim 7, characterized in that in the deflecting cage (8) is arranged in the nut (3) axially next to a bushing flange (11) of the nut (3) comprising a screw track 12.

* * * * *